United States Patent Office 3,491,840
Patented Jan. 27, 1970

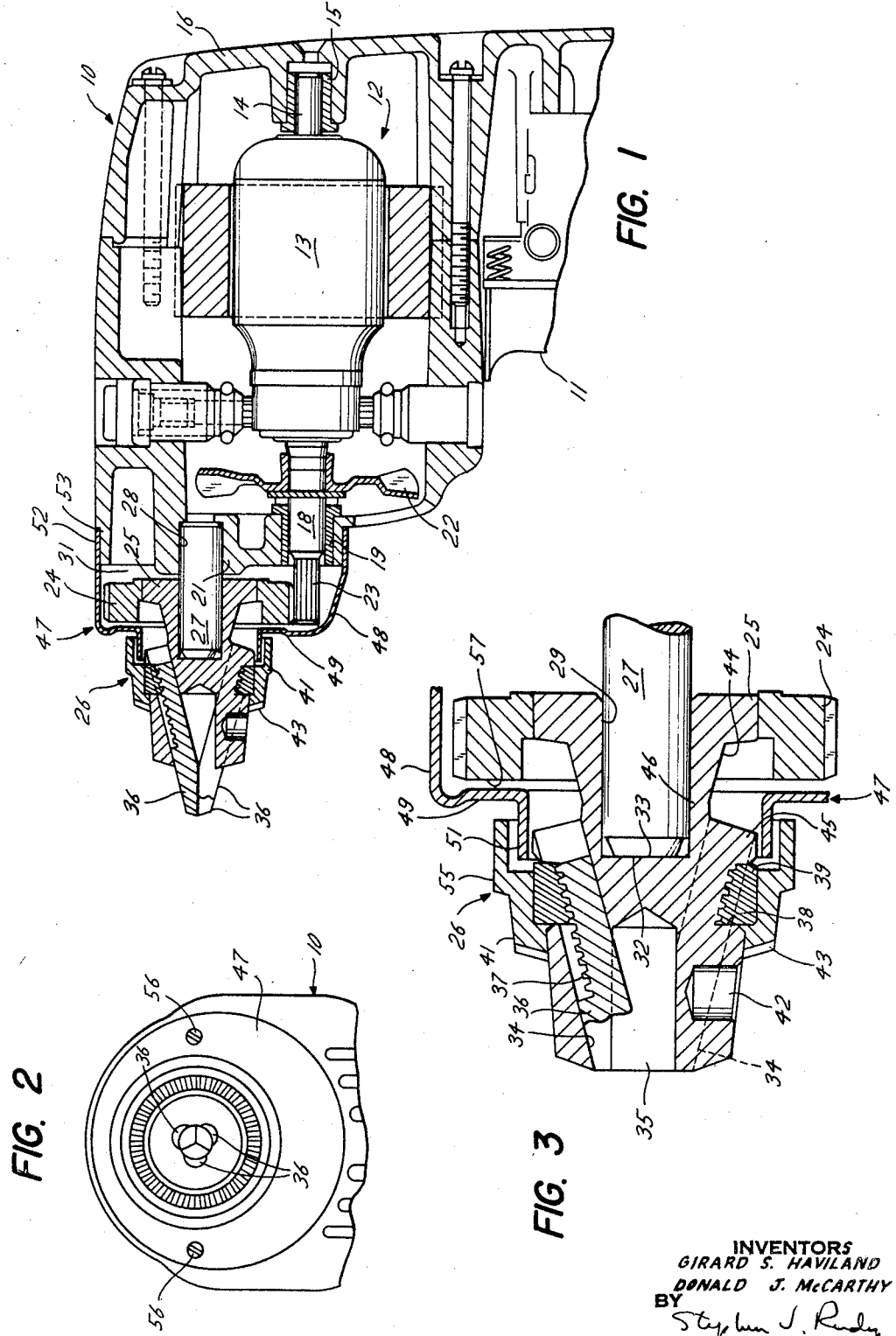

3,491,840
ELECTRICAL DRILL HAVING AN INTEGRATED CHUCK
Girard S. Haviland, West Hartford, and Donald J. McCarthy, Wethersfield, Conn., assignors to The Jacobs Manufacturing Company, West Hartford, Conn., a corporation of New Jersey
Filed Mar. 19, 1968, Ser. No. 714,180
Int. Cl. E21c 1/00; B23b 39/14
U.S. Cl. 173—163                                    10 Claims

ABSTRACT OF THE DISCLOSURE

A portable electrical drill of relatively short axial length having a slidable converging jaw chuck, the cylindrical body of which is combined and made unitary with a driven gear and supported for rotation upon a stationary bearing pin. A nose cap closing the front end of the tool is of non-precision requirements, and protectively covers over gearing connecting the chuck with a driving motor.

BACKGROUND OF INVENTION

The invention is concerned with an electrically powered drill of the manually portable type, having a slidable converging jaw chuck.

Drills of this general nature are known as having a chuck body threadedly mounted to the usual spindle which is supported in appropriate bearings and carries a spindle gear having a driven connection with a motor shaft. In these known tools a nose casting closing the front end of the tool's housing has a precision located bearing support for the spindle, and protectively covers the drive gearing mechanism. Because of the multiple succession of parts in these known drills, their resultant axial length impedes use of the drill in close quarters. Because of the precision locating requirements of the nose casting which supports the usual spindle bearing, and because of the multiple number of parts, such known tools are costly to manufacture and to repair.

The general objective of this invention is to provide a portable type electrical drill which, as compared with conventional tools, is of relatively shorter overall length, has fewer components, and limited precision requirements. A tool of this construction can be used in unconventionally close quarters, and is relatively inexpensive to manufacture and repair.

A feature of the invention is a chuck having a body which is integrated or made unitary with a driven gear whereby the usual spindle to which the conventional chuck body is threadedly mounted is eliminated.

A further feature is a stationary horn or bearing pin formed of oil impregnated material upon which the integrated chuck body is supported for relative rotation. This bearing pin replaces the usual spindle and associated bearings found in known tools.

Another feature is a nose cap which is mountable over the front end of the housing so as to protectively cover the gear portion of the chuck body and the related motor driven gearing. The cap serves in part as a protective covering and is not required to support any bearing elements. Accordingly, it has no precision or locating requirements. The cap also serves as a bearing abutment having cooperation with the chuck so as to prevent escape of the latter from the bearing pin.

BRIEF DESCRIPTION OF THE DRAWING

In the accompanying drawing:
FIG. 1 is a view in longitudinal section of an electric portable hand-held drill embodying the invention;
FIG. 2 is a front end view of FIG. 1, with the lower portion broken away; and FIG. 3 is a detail in section of the integrated chuck body and gear with associated components.

DETAILED DESCRIPTION OF A PREFERRED EMBODIMENT

Reference is directed to the drawing wherein the invention is illustrated as embodied in a rotary tool, such as an electrical drill. The drill includes a housing 10 having a pistol handgrip 11. Within the housing is mounted a conventional electric motor 12 having a rotor 13. The rear end 14 of the rotor shaft is supported in a bearing 15 mounted in a backwall 16 of the housing. The driving end portion 18 of the rotor shaft is supported in a bearing 19 mounted in a transverse wall or head 21 at the forward end of the housing. Between wall 21 and the rotor 13 a cooling fan 22 is mounted upon the rotor shaft. A pinion portion 23 of the rotor shaft projects axially beyond the bearing 19 and wall 21. It has a driving engagement with a chuck gear 24 carried by a cylindrical body 25 of a slidable converging jaw chuck 26. The chuck gear 24 and the chuck body 25 define an integrated whole or unitary structure in which the gear and body are rigid with one another, the gear being fixed, as by press fitting to the periphery of the chuck body. The axis of the chuck gear coincides with that of the chuck body.

The chuck body is axially supported for rotation upon a stationary cylindrical horn or bearing pin 27. The latter is fixed at its rear in a bore 28 of the housing wall 21 and extends axially forward in parallel relation to the driving shaft portion 18 of the rotor. The pin extends slidably with a bearing fit into a cylindrical axial bore 29 formed in the rear of the chuck body. A slight clearance 31 spaces the rear of the chuck body from the opposed end face of the housing wall 21 when the chuck body is fully seated upon the pin. The pin has a radial flat end 32 against which a corresponding flat surface 33 at the bottom of the chuck bore 29 is adapted to bear. Accordingly, the pin not only serves as a radial bearing supporting the chuck for rotation, but also serves as a thrust bearing for the chuck. The bearing pin 27 is formed of material having inherent lubricating qualities such as oil impregnated powder metal.

The chuck gear is located at the rear peripheral portion of the chuck body. Forwardly of the gear the chuck body is provided with three inclined jaw tracks or slots 34, the axes of which converge downwardly and forwardly and meet in a common point coincident with the longitudinal axis of the chuck body. The several slots intersect a cylindrical work receiving bore 35 extending axially into the front end of the chuck body. In each slot an elongated jaw 36 is slidably disposed for guided movement to open and closed conditions with the other jaws relative to work received in the work bore 35.

The jaws are provided along their back portions with screw threads 37 which are exposed through the slots in a peripheral groove 38 of the body of the chuck. These threads are engaged with complementary internal threads of a surrounding nut 39 located in the groove and fixed to the interior wall of a jaw actuating sleeve 41. The sleeve is mounted upon the body of the chuck for relative rotation. The several jaws are caused to be moved as a set by the nut to open or closed condition accordingly as the sleeve is rotated in a clockwise or counterclockwise direction. The sleeve is rotatable in a selected direction by means of a key (not shown) having a pilot end insertable in a radial bore 42 of the chuck body and having a pinion which is cooperable with a beveled gear surface 43 of the sleeve.

A second relatively wider groove 44 is provided about the chuck body adjacent the chuck gear. A narrow annular rib 45 separates the two grooves 38 and 44. Groove 44 serves in part to lighten the weight of the chuck body.

Further, air circulating in the groove 44 about the narrow annular body portion 46 separating the groove from the bearing pin tends to avoid development of undesirable heat in the pin and in the body of the chuck.

A nose cap 47, stamped from sheet metal, is mounted over the front end of the housing so as to retain the chuck body upon the bearing pin 27 against endwise escape, and also to protectively cover the gearing elements 23 and 24. The cap is open in its ends, and has a rear portion 48 of enlarged diameter joined by a radial flange 49 to a forward neck portion 51 of reduced diameter. The enlarged cap portion 48 surrounds the gearing mechanism 23, 24. It has a marginal rear portion 52 which is sleeved over a corresponding section of the front end of the housing and limits against a shoulder 53 of the housing. The neck portion 51 of the cap surrounds the chuck body adjacent the chuck gear with a slight clearance; and it underlies with a slight clearance an overhanging rear annular end 55 of the jaw actuating sleeve 41. The cap is held in place by means of bolts 56 passed through the cap flange 49 and threadedly engaged in the housing wall. The interior wall surface of the cap flange fronts with a slight clearance an annular forward radial wall 57 of the chuck gear whereby the chuck is blocked against endwise escape from the bearing pin 27. The slight clearance between the gear wall 57 and the cap flange 49 allows a corresponding desirable limited end play of the chuck upon the bearing pin. The interior wall of the cap flange 49 also serves as a thrust bearing surface for the chuck gear.

What is claimed is:

1. In a rotary tool including a housing having a transversely extending forward wall, a cylindrical bearing pin stationary with the wall and projecting axially forward therefrom, a chuck having a cylindrical body provided with an axial bore in its rear end in which the bearing pin is slidably received allowing rotation of the body relative to the bearing pin, and a chuck drive gear rigidly integrated with the body, the axis of the gear being coincident with the axis of rotation of the body, wherein the bearing pin is formed of oil impregnated powder metal.

2. In a rotary tool including a housing having a transversely extending forward wall, a cylindrical bearing pin stationary with the wall and projecting axially forward therefrom, a chuck having a cylindrical body provided with an axial bore in its rear end in which the bearing pin is slidably received allowing rotation of the body relative to the bearing pin, and a chuck drive gear rigidly integrated with the body, the axis of the gear being coincident with the axis of rotation of the body, wherein the chuck is slidable in an axial direction free of the bearing pin, abutment means is carried by the chuck, and stop means carried by the housing is cooperable with the abutment means to restrain the chuck from sliding free of the bearing pin.

3. In a rotary tool including a housing having a transversely extending forward wall, a cylindrical bearing pin stationary with the wall and projecting axially forward therefrom, a chuck having a cylindrical body provided with an axial bore in its rear end in which the bearing pin is slidably received allowing rotation of the body relative to the bearing pin, and a chuck drive gear rigidly integrated with the body, the axis of the gear being coincident with the axis of rotation of the body, including a motor mounted in the housing having a drive shaft extending axially forward through the transversely extending wall and drivingly connected to the chuck drive gear, there being a cap engaged upon the housing freely surrounding the body of the chuck and protectively covering over the chuck drive gear and the motor drive shaft, wherein the chuck drive gear has an annular wall radial to the periphery of the chuck body; and the cap is of open-ended tubular form comprising an enlarged section seated fast at its rear upon the forward wall of the housing and extending forwardly in surrounding relation to the chuck drive gear and the motor drive shaft, a forwardly extending neck section freely surrounding the chuck body forwardly of the chuck drive gear, and a radial annular flange joining the neck and enlarged sections of the cap closely fronting the radial wall of the chuck drive gear, the flange being cooperable with the radial wall to curb endwise movement of the chuck body relative to the bearing pin.

4. A slidable jaw rotary chuck comprising a cylindrical body having a group of downwardly and forwardly converging jaw tracks, a work gripping jaw slidable in each track, a jaw actuating sleeve rotatable upon the body having an internal screw driving engagement with the several jaws for selectively sliding the jaws as a set to open or closed condition, a chuck driving gear fixed upon the periphery of the body and having its axis coincident with the axis of rotation of the body, and the body having in its rear end an axially extending cylindrical bore for slidable reception of a cylindrical bearing pin, the chuck driving gear being adapted for engagement with the driving pinion of a motor shaft.

5. A slidable jaw rotary chuck comprising a cylindrical body having a group of downwardly and forwardly converging jaw tracks, a work gripping jaw slidable in each track, a jaw actuating sleeve rotatable upon the body having an internal screw driving engagement with the several jaws for selectively actuating the jaws as a set along the tracks to open or closed condition, a chuck driving gear fixed upon the periphery of the body and having its axis coincident with the axis of rotation of the body, the body having in its rear an axially extending cylindrical bore, and a stationary cylindrical bearing pin having a slidable bearing fit in the bore.

6. A slidable jaw rotary chuck as in claim 5, including a housing having a transversely extending end wall with which the bearing pin is stationary and extends axially forward therefrom.

7. A slidable jaw rotary chuck as in claim 6, including a motor having a drive shaft projecting axially beyond the housing end wall and having a driving connection with the gear.

8. A slidable jaw rotary chuck as in claim 6, including an open ended tubular cap detachably fixed upon the housing about the end wall and projecting axially forward, the cap having a rear enlarged portion freely surrounding the gear and the motor drive shaft and having a reduced neck portion surrounding the chuck body in close free relation thereto forwardly of the gear, the gear having an annular wall rising radially from the body of the chuck, and the cap having a radial flange closely fronting the annular wall of the gear whereby the chuck body is blocked against endwise escape from the bearing pin.

9. A slidable jaw rotary chuck as in claim 5, wherein the bearing pin is formed of oil impregnated powder metal.

10. A slidable jaw rotary chuck as in claim 5, wherein the bearing pin has a radial flat end surface, and the bore has at its bottom a flat surface against which the end surface of the bearing pin is adapted to bear.

References Cited

UNITED STATES PATENTS

| 426,618 | 4/1890 | Hardsocg | 173—163 |
| 721,037 | 2/1903 | Haeseler et al. | 173—163 |
| 2,685,042 | 7/1954 | Klett | 310—50 |
| 2,904,964 | 9/1959 | Kupka | 175—6 |
| 3,417,566 | 12/1968 | Gould | 173—163 |

JAMES A. LEPPINK, Primary Examiner

U.S. Cl. X.R.

77—7; 310—50